(12) United States Patent  
Zalewski et al.

(10) Patent No.: US 11,327,182 B2  
(45) Date of Patent: May 10, 2022

(54) METHOD AND DEVICE FOR DETECTING CORRECTION INFORMATION FOR AN ANTENNA OF A VEHICLE

(71) Applicant: CONTINENTAL TEVES AG & CO OHG, Frankfurt am Main (DE)

(72) Inventors: Michael Zalewski, Frankfurt am Main (DE); Ulrich Stählin, Oakland Township, MI (US)

(73) Assignee: CONTINENTAL TEVES AG & CO OHG, Frankfurt am Main (DE)

( * ) Notice: Subject to any disclaimer, the term of this patent is extended or adjusted under 35 U.S.C. 154(b) by 1 day.

(21) Appl. No.: 16/772,949

(22) PCT Filed: Nov. 8, 2018

(86) PCT No.: PCT/EP2018/080535  
§ 371 (c)(1),  
(2) Date: Jun. 15, 2020

(87) PCT Pub. No.: WO2019/115098  
PCT Pub. Date: Jun. 20, 2019

(65) Prior Publication Data  
US 2021/0165104 A1   Jun. 3, 2021

(30) Foreign Application Priority Data  
Dec. 15, 2017 (DE) .................. 10 2017 222 912.8

(51) Int. Cl.  
*G01S 19/23* (2010.01)

(52) U.S. Cl.  
CPC ............ *G01S 19/235* (2013.01); *G01S 19/23* (2013.01)

(58) Field of Classification Search  
CPC ................................ G01S 19/23; G01S 19/235  
See application file for complete search history.

(56) References Cited

U.S. PATENT DOCUMENTS

| | | | | |
|---|---|---|---|---|
| 5,359,521 A | * | 10/1994 | Kyrtsos | ................... G01S 19/41 701/470 |
| 2010/0034421 A1 | * | 2/2010 | Roberts | ................... G01S 19/43 382/100 |

(Continued)

FOREIGN PATENT DOCUMENTS

| | | |
|---|---|---|
| CN | 106443744 A | 2/2017 |
| DE | 102008045618 A1 | 3/2010 |
| EP | 3367133 A1 | 8/2018 |

OTHER PUBLICATIONS

Residue. (2016). The American Heritage Dictionary of the English Language (6th ed.). Houghton Mifflin. Credo Reference: https://search.credoreference.com/content/entry/hmdictenglang/residue/0 (Year: 2016).*

(Continued)

*Primary Examiner* — Bernarr E Gregory  
*Assistant Examiner* — Fred H Mull  
(74) *Attorney, Agent, or Firm* — Dickinson Wright PLLC

(57) ABSTRACT

A method and corresponding device for detecting correction information for an antenna for receiving data of a satellite of a satellite navigation system includes the steps of determining first distance information of the antenna relative to a satellite of a satellite navigation system, capturing position information and orientation information of the antenna on the basis of sensor information, determining second distance information of the antenna relative to the satellite on the basis of the position information captured using sensor information, detecting a deviation of the first distance information from the second distance information, determining correction information on the basis of the detected deviation, and storing, in a data memory, the correction information regarding the orientation information captured by the sensor information. The correction information can be used in (Continued)

particular for correcting an angle-dependent phase center offset.

19 Claims, 1 Drawing Sheet

(56) References Cited

U.S. PATENT DOCUMENTS

2018/0120442 A1* 5/2018 Powe .................. G01S 19/03
2018/0246217 A1* 8/2018 Wuebbena ............ G01S 19/235

OTHER PUBLICATIONS

Andrew J O'Brien—Precise Calibration of Adaptive Antennas for GNSS Receivers on Platforms, GNSS 2011—Proceedings of the 24th International Technical Meeting of the Satellite Division of the Institute of Navigation (ION GNSS 2011), The Institute of Navigation, 8551 Rixlew Lane Suite 360 Manassas, Va 20109, USA.
Bilich, Andria, Mader, Gerald L., GNSS Absolute Antenna Calibration at the National Geodetic Survey, Proceedings of the 23rd International Technical Meeting of The Satellite Division of the Institute of Navigation (ION GNSS 2010), Portland, OR, Sep. 2010,S. 1369-1377.
Philipp Zeimetz, Matthias Becker, Heiner Kuhlman, Steffen Schon, Lambert Wanninger—"Berucksichtigung von Antennenkorrekturen bei GNSS—Anwendungen" In: DVW-Merkblatt Jan. 2011, WiBner-Verlag, Augsburg, 2011.

* cited by examiner

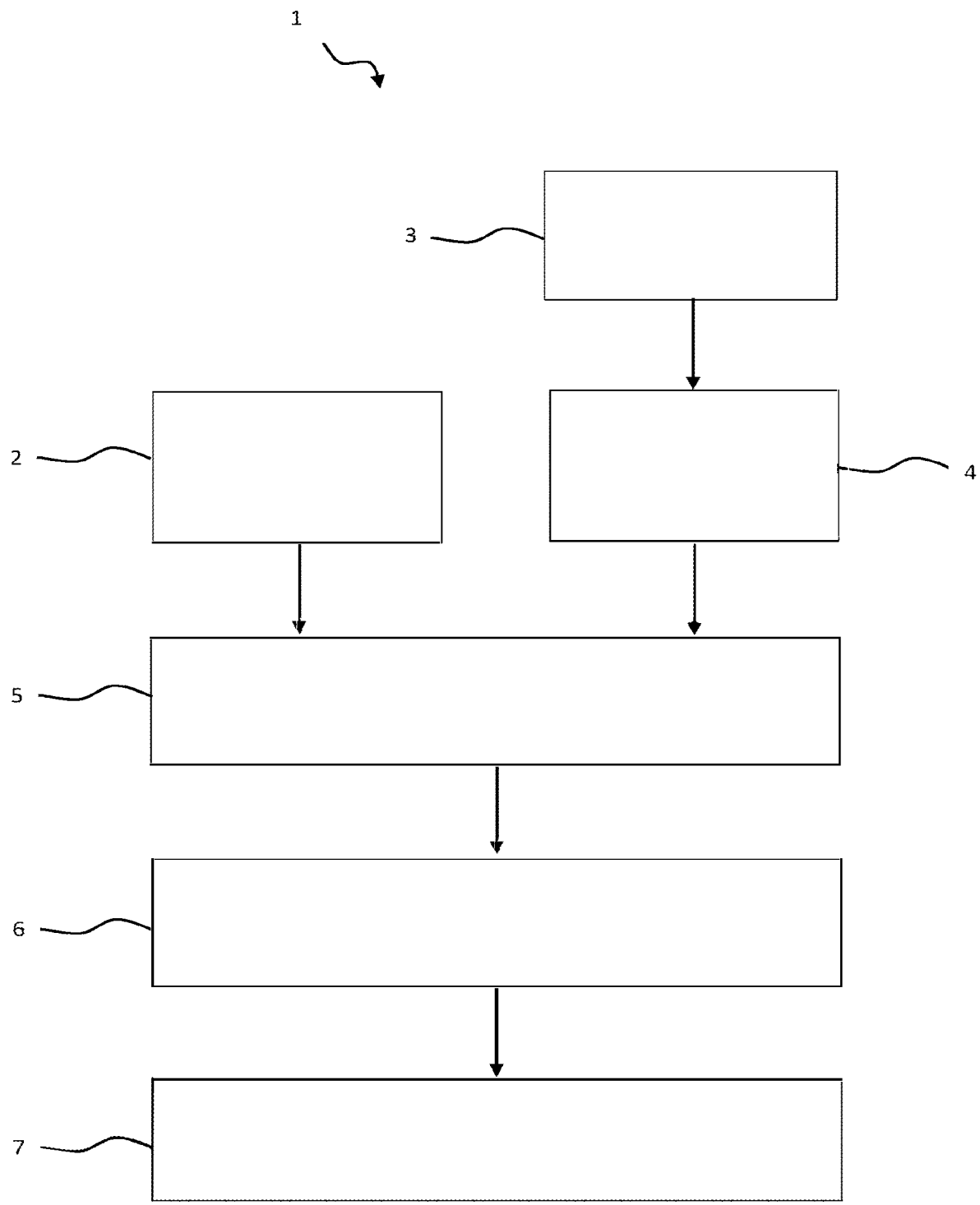

METHOD AND DEVICE FOR DETECTING CORRECTION INFORMATION FOR AN ANTENNA OF A VEHICLE

CROSS-REFERENCE TO RELATED APPLICATIONS

This application claims priority to German Patent Application No. 10 2017 222 912.8, filed Dec. 15, 2017 and International Application No. PCT/EP2018/080535, filed Nov. 8, 2018.

FIELD OF THE INVENTION

The present invention relates to a method and a device for detecting correction information for an antenna.

BACKGROUND OF THE INVENTION

New functions increasingly require more precise information regarding the position and the orientation of a vehicle.

For localization by a global satellite navigation system, pseudo ranges between the respective satellites and a GNSS receiver can be determined by code measurements, and differences in range between the various satellites and the GNSS receiver can be determined by carrier phase measurement, and the position of the receiver can be calculated. The distance between the phase center of the GNSS antenna and the phase center of the satellite antenna is detected by propagation time measurement for the determination of the pseudo ranges. The phase center of an antenna is a virtual point, to which the measurement refers and which usually has both a directional dependence and can, in addition, be arranged by a few meters in the space around the antenna, the so-called phase center variation. Due to the various positions of the satellites, this can therefore result in an—in part considerably—deviating phase center of the GNSS antenna for each satellite. So as not to negatively influence the GNSS position determination, the GNSS satellites transmit correction terms for the virtual phase center of the respective satellite antenna, in order to be able to correct these effects.

The usual measurement accuracy with code measurement is currently in the range of a few meters, which is why a GNSS antenna can be used, the phase center of which has a scattering in the range of centimeters to decimeters and is therefore not of essential importance for the evaluation. The accuracy of this type of GNSS receiver is insufficient for future functions.

Precisely measured antennas without significant directional dependence as well as more powerful processing electronics are accordingly deployed for more precise applications, wherein an accuracy in the millimeter range can be achieved, for example by carrier phase measurement. In order to calibrate, the phase center is measured under laboratory conditions over as large as possible a solid angle around the antenna. A transmitter supplies the antenna with a test signal from different directions. In connection with this, the position and orientation of the antenna and transmitter are known. As a result, the position of the phase center, for example relative to the antenna reference point (ARP), the so-called phase center offset, can be determined as a function of the direction of incidence, which position is used to correct the directional dependence of the phase center during the determination of the position. The disadvantage is that correspondingly high-quality GNSS receivers or antennas are very costly and, therefore, are not considered for mass production in particular in the vehicle supply industry which is subjected to high cost pressure.

SUMMARY AND INTRODUCTORY DESCRIPTION OF THE INVENTION

It is therefore an object of the present invention to provide a solution which makes possible an improved accuracy with an antenna which is as inexpensive as possible.

This object is achieved by the subject-matter described herein.

The invention describes a method for detecting correction information for an antenna for receiving data of a satellite of a satellite navigation system, having the steps of:

determining first distance information of the antenna relative to a satellite of a satellite navigation system, capturing position information and orientation information of the antenna on the basis of sensor information, determining second distance information of the antenna relative to the satellite on the basis of the position information captured by sensor information, detecting a deviation of the first distance information from the second distance information, determining correction information on the basis of the detected deviation, and storing, in a data memory, the correction information regarding the orientation information captured by the sensor information.

The concept which forms the basis of the invention is that by using distance information of the antenna relative to a satellite, which is obtained in different ways, and taking account of the orientation, an estimation of correction information of the angle-dependent phase center offset of the antenna can be produced. Position information of the antenna expediently defines a reference point, for example the antenna reference point, the position of which can be determined within a global coordinate system. Orientation information in this sense is preferably an orientation of the antenna in particular regarding information describing a global coordinate system. In satellite navigation systems, the respective satellite positions are usually transferred with the ephemerides such that these positions can in principle be assumed to be known. The first distance information can for example be detected with the aid of the signal propagation time of the data transferred by the satellite to the antenna or as the receiving intensity of the signal. Accordingly, the comparability of the distance information is preferably of interest, accordingly an absolute distance value relative to the satellite does not necessarily have to be taken as the basis. For example, a receiving intensity can also be compared to an expected receiving intensity. Distance information is inherent in both. This procedure is already known for global satellite navigation systems.

If a direction-dependent phase center offset exists, a different phase center offset value is produced for the given alignment of the antenna for each received satellite signal which can be accordingly compensated for in the knowledge thereof. This calculation is preferably performed for each received satellite. The method according to the invention is accordingly expediently performed for a plurality of satellites of one or more satellite navigation systems. On the basis of the satellite position transferred with the ephemerides, there exists the possibility, with the acquired knowledge of the orientation and detected direction-dependent correction parameter, of taking account of the receiving direction of each satellite with respect to the directional dependence of the phase center offset.

Starting from a known absolute orientation in a global coordinate system, the correction information of the angle-dependent phase center offset of the antenna is detected, taking account of the captured orientation information. As a result, the technical advantage of an increased accuracy during localization and determination of the orientation can be achieved when a comparatively inexpensive antenna or GNSS receiver is present. Since simple calculation specifications can be taken as the basis, low computational resources are also required. In principle, a one-off measuring process is sufficient for the determination of the correction information.

The phase center offset is usually code and frequency-dependent. With high-priced GNSS antennas for precision applications, an optimum must be found for multiple frequency ranges with a single design, which is usually counter-dependent. The antenna is frequently optimized for one frequency, typically L1. This gives a larger phase center offset for L2 than for an antenna optimized for L2. Alternatively, antennas are designed in such a way that as good as possible a compromise of the phase center offsets of L1 and L2 is achieved, as a result of which the accuracy deteriorates for both frequencies.

With respect to this, a further advantage of the invention is that an application cannot only be realized for GPS L1 C/A, but, in order to detect correction information, can also be directly implemented for other frequencies L2, L5 and codes (P(Y) . . . ), wherein only new or further correction information based on the respective frequency is captured and used for correction. It is not necessary to adapt the antenna design for this. Therefore, a further disadvantage of the prior art can be overcome.

According to a further aspect, the method is at least partially executed during a calibration journey with a vehicle having the antenna, in particular by an electronic control unit included in the vehicle. A high accuracy of the measurement can in particular be achieved if the driving dynamics values remain within a stationary range during the calibration journey, that is to say the slippage of the wheels is as low as possible during the calibration journey, for example. The fact that the antenna is already mounted on the vehicle means that repercussions of the vehicle components on the directional dependence of the phase center are also taken account of during the determination of the calibration parameters.

In accordance with a further aspect of the invention, initial position information in a global coordinate system and initial orientation information are captured at a starting point of the calibration journey, wherein during the calibration journey the position information and the orientation information are captured on the basis of sensor information regarding a change in terms of the initial position information and initial orientation information at the starting point. A relative orientation based on the starting point of the calibration journey and/or an absolute orientation in particular based on a coordinate system of a global satellite system can be used as the orientation, wherein corresponding conversions can be carried out.

Consequently, starting from a known absolute orientation in a global coordinate system at a starting point of the calibration journey, the correction information of the phase center offset of the antenna can be detected with the aid of the orientation information captured during the calibration journey.

Sensor information and/or values stored in a data memory, in particular of the vehicle, are preferably used as initial position information and/or initial orientation information at the starting point of the calibration journey. The values stored in the data memory can, for example, have been stored on the completion of a previous journey or can, by way of example, be stored during the course of or following the production of a vehicle, wherein the calibration journey is preferably effected on a defined calibration range.

According to a further aspect, the initial position information and/or initial orientation information obtained by sensor information at the starting point of the calibration journey is based on information fused from sensor information by a state estimator, e.g. a variant of a Kalman filter. The uncertainty of an output of the state estimator at the starting point of the calibration journey already expediently lies below a tolerable limit. What is considered tolerable can in particular be decided in an application-specific manner. That is to say, the state estimator is preferably already in a steady state. An improved data accuracy can be achieved therewith, or the sources of information can be mutually validated therewith.

The initial position information and the initial orientation information at the starting point of the calibration journey and/or the position information and the orientation information during the calibration journey are preferably detected by the vehicle's own sensor technology and/or a reference measuring device. In particular, the change in the orientation based on a starting point of the calibration journey is captured by this sensor technology. The position information and/or orientation information obtained by sensor information during the calibration journey is preferably based on information fused by a state estimator, e.g. a variant of a Kalman filter, from sensor information in particular of the vehicle. The reference measuring device expediently supplies more accurate information than can be produced with the vehicle's own sensor technology.

The vehicle's own sensor technology is in particular an inertial measuring unit (IMU) and/or wheel speed sensors and/or steering angle sensor technology and/or a compass. An exemplary method which uses at least one antenna as the vehicle's own sensor technology for the purpose of determining the orientation is described in DE 10 2016 219 935.8.

The range driven during the calibration journey is preferably substantially circular or elliptical. Alternatively or in addition, a calibration range can be provided, which comprises a plurality of changes of direction, in particular a calibration range comparable to an eight or an infinity symbol. By selecting the range driven during the calibration journey, the receiving directions of the signals of the satellites can be influenced. Consequently, by making an appropriate selection of the course of the range, a coverage of 360° azimuth angle of the signals of each received satellite around an antenna can be achieved. Due to the various positions of the satellites, calibration values for various elevation angles with respect to an antenna can consequently also be obtained.

The calibration range is preferably driven through multiple times during the calibration journey. This produces a larger population of the measured values and, thus, statistical certainty, such that the accuracy of the result of the optimization calculation can in turn be improved and the quality of the correction information can be increased.

In a preferred further aspect, a plurality of calibration journeys is carried out, wherein the calibration journeys are performed at different times or with satellite constellations. Since the GNSS satellites occupy various positions above the Earth's surface at different times, a plurality of different incidence angles—elevation and azimuth—can consequently be taken into account for the calibration. Alternatively or in addition, the calibration range can include a steep curve (curve with inclination to the side of the lower radius). A plurality of different incidence angles of as large as possible a solid angle can also be taken into account for the calibration by this procedure.

According to a further aspect, alternative or complementary procedures in joint implementation for detecting the correction information are provided.

Offline: In accordance with an aspect, measuring data, in particular pseudo ranges and/or driving dynamics data, are initially simply plotted and stored during the calibration journey. Accordingly, a plurality of correction information is at least determined on the basis of the detected deviations and the correction information is preferably not stored in the data memory during the calibration journey. It can also be provided that the deviations are not detected during the operational journey.

A corresponding set of correction parameters is preferably subsequently detected on the basis of the data captured in such a way by optimization calculation, for example by the least squares method.

Online: a plurality of correction information is determined on the basis of the detected deviations and the correction information is preferably stored in the data memory during the calibration journey. Accordingly, in accordance with a further aspect of the method according to the invention, the calculation of the correction information is carried out on the basis of an optimization calculation during the calibration journey, in particular with a recursive calculation specification, for example with an RLS algorithm (Recursive Least Squares algorithm).

Furthermore, it can be provided that measuring signals of a reference measuring technology are used as comparative values in the sense of an actually present position or orientation for the optimization problem of the calculation of the correction information. Regarding these comparative values, in order to achieve the optimization object, a minimum of the deviation is to accordingly be determined. This procedure can also preferably be performed offline and/or online.

Correction values and/or calculation specifications, e.g. polynomial interpolation, are preferably generated as correction information. The correction values can in particular be saved in a table, as a polynomial or in the form of another calculation basis.

In accordance with a further aspect of the method, the orientation with respect to a global coordinate system is determined using a plurality of the detected correction information. A determination of this nature is in particular carried out during the constant operation of the vehicle, that is to say during the use of the vehicle. Accordingly, a method for determining the orientation of a vehicle or of the antenna would exist.

It is preferably determined by optimization calculation, at which orientation the smallest residues are produced for the correction information, wherein the orientation determined in such a way is deemed to be the actual orientation and in particular is used by at least one vehicle system. A vehicle system regarding this is, for example, a navigation system of the vehicle.

The position of the vehicle or the distance from the satellites of a global satellite navigation system and/or a expected reception strength of the satellite signals are expediently detected.

The correction information is used in particular for correcting angle-dependent phase center offsets, in particular regarding an antenna reference point, of the antenna. The correction information accordingly expediently describes an absolute value of the phase center offset regarding the antenna reference point.

According to a further aspect, in order to correct the angle-dependent phase center offset, the first distance information of the antenna relative to a satellite of the satellite navigation system, which is captured by the antenna, is corrected using the correction information and, in particular, using the orientation information.

In accordance with a preferred embodiment of the method, in order to correct the angle-dependent phase center offset, an absolute value of the correction information is deducted from a value of the distance information of the antenna relative to the satellite, which is captured by the antenna.

Consequently, a more accurate positioning is attained. The detected orientation can either be utilized in a subsequent capturing step or a correcting calculation of the position is still effected in the same capturing step, using the correction information. With respect to the captured orientation, the correction information can therefore be directly used to improve the accuracy of the determination of the position by taking account of the direction-dependent phase center offset.

The method according to the invention for detecting correction values can preferably also be executed under laboratory conditions, in particular in such a way the antenna is supplied with GNSS signals from different directions.

Furthermore, the invention relates to a device for detecting correction information for an antenna. The device includes:

an electronic control unit, and an antenna for receiving data of a satellite navigation system, wherein the electronic control unit is configured to:

determine first distance information of the antenna relative to a satellite of a satellite navigation system, capture position information and orientation information of the antenna on the basis of sensor information, capture second distance information of the antenna relative to the satellite on the basis of the position information captured by sensor information, detect a deviation of the first distance information from the second distance information, determine correction information on the basis of the detected deviations, and store, in a data memory, the correction information regarding the captured orientation information.

According to a preferred aspect, the device is configured to determine a geographical position of the vehicle with the aid of signals of a plurality of satellites.

The electronic control unit preferably includes a processor which is designed to determine a geographical position of the vehicle with the aid of signals of a plurality of satellites, which are received by the antenna. The processor can alternatively or in addition be configured to determine the orientation of the vehicle using sensor signals and/or the satellite signals.

According to a preferred embodiment, the device is configured to receive and to process NAVSTAR GPS, GLONASS, GALILEO and/or BEIDOU satellite signals.

According to a preferred aspect, the electronic control unit additionally comprises a memory for storing data.

The device is configured to execute at least one aspect of the method according to the invention. Further features of the device result directly from the functionality and/or the features of the method, wherein the device has suitable functional components for executing the method.

According to another aspect, the object is achieved by a computer program having program code for executing at least one embodiment of the method according to the invention, if the program code is run on a computer.

The device can be mounted in cars, in airplanes or in ships.

BRIEF DESCRIPTION OF THE DRAWINGS

The Figure shows a flow chart of a preferred embodiment of the method 1 according to the invention.

DETAILED DESCRIPTION

In the following description, numerous specific details are presented for explanatory purposes in order to convey an in-depth understanding of one or more aspects of the invention. It can, however, be apparent to a person skilled in the art that one or more aspects or embodiments can be executed with a lower degree of specific details. In other cases, known structures and elements are represented in schematic form, in order to facilitate the description of one or more aspects or embodiments. It is understood that other embodiments can be used and structural or logical changes can be carried out, without deviating from the concept of the present invention.

Even though a specific feature or a specific aspect of an embodiment may have been disclosed with respect to only one of multiple implementations, such a feature or such an aspect can in addition be combined with one or more other features or aspects of the other implementations, as can be desired and advantageous for a given or specific application. Furthermore, to the extent that the expressions "contain", "have", "with" or other variants thereof are either utilized in the detailed description or the claims, such expressions should be inclusive in a similar way to the expression "comprise". In addition, the expression "by way of example" is simply to be construed to be one example instead of the designation for the best or optimum. The following description is therefore not to be understood in a restrictive sense.

In the case of a GNSS system, the satellite position is in principle transferred with the ephemerides. The position of the vehicle and, consequently, also the receiving direction can be determined from these values, taking account of the direction-dependent phase center offset (PCO). A very simplified exemplary calculation basis of a pseudo range PSRARP of a satellite relative to the antenna reference point is represented below:

Azimuth=150°; elevation=30°
Pseudo range (PSR)=22123,456.400 m
Phase center offset (PCO)=1.45 m
PSRARP=PSR−PCO=22123,456.400 m−1.45 m=22123454.950 m During the journey of the car, the orientation of the antenna with respect to a satellite changes e.g. during cornering, and another correction value is selected for example for the azimuth, such that a deviating phase center offset ( ) from the above is produced for the respective satellite. For example, the vehicle turns 10° to the left, wherein the elevation remains the same and the azimuth rises:

Azimuth=160°; elevation=30°
PSR=22123,456.400 m
Phase center offset (PCO)=1.7 m
PSRARP=PSR−PCO=22123,456.400 m−1.70 m=22123454.700 m If a direction-dependent phase center offset exists, a different offset value is produced at the given alignment of the antenna for each received satellite signal, which offset value can be accordingly compensated for with knowledge of the phase center offset. This calculation is performed for each received satellite such that all pseudo range measurements refer to the same antenna reference point (ARP). With this corrected data, a more precisely defined determination of the ego position can subsequently be made.

The prerequisite for the above calculations is sufficiently accurate knowledge of the orientation of the antenna or respectively of the vehicle as well as the existence of direction-dependent correction information for the phase center offset. The orientation cannot, however, be derived directly from the information of a GNSS signal as such, and the correction information is not available in particular with comparatively inexpensive antennas.

The Figure shows a flow chart of a preferred aspect of method 1 according to the invention. Accordingly, first distance information of the antenna relative to a satellite of a satellite navigation system is determined in a step 2. In a step 3, position information and orientation information of the antenna are captured on the basis of sensor information, wherein second distance information of the antenna relative to the satellite is determined on this basis in a step 4. Subsequently, a deviation of the first distance information from the second distance information is detected in a step 5. On the basis of the detected deviation, correction information is determined in a step 6 and the correction information regarding the orientation information captured by the sensor information is stored in a data memory in a step 7. Preferred aspects of the invention are explained in more detail below for the purpose of providing a deeper understanding.

That is to say, on the basis of the satellite position transferred with the ephemerides, there is a possibility, with the acquired knowledge of the orientation and detected direction-dependent correction parameters, of taking account of the receiving direction of each satellite with respect to the directional-dependence of the phase center offset. Correspondingly constructed high-quality GNSS receivers or antennas, possibly with correction information, are, however, very costly. In the case of reception devices which are as inexpensive as possible, as they are to preferably be used in the vehicle, the existence of corresponding correction values cannot be assumed. In accordance with an exemplary aspect of the invention, the correction information is therefore detected in accordance with the following procedure.

Under conditions which make possible unhindered satellite reception, a calibration journey is performed with a vehicle having the GNSS receiving device. This is effected, for example, by driving in a circle at least once. Alternatively or in addition to a circular calibration range, a calibration range can be provided, which includes a plurality of changes of direction, in particular a calibration range comparable to an eight or an infinity symbol. The alignment of the GNSS antenna based on the vehicle is known such that it is possible to deduce the orientation of the vehicle when determining the orientation of the GNSS antenna.

Prior to the start of the calibration journey, initial state information is detected by suitable sensors and/or position and/or orientation determining devices inside the vehicle or belonging to the vehicle. This information can be fused by a state estimator, e.g. a Kalman filter. At the starting point of the calibration journey, the state estimator is therefore preferably already in a steady state, that is to say has a sufficiently converged state. Alternatively or in addition, values stored in a data memory can be used or a highly accurate reference measuring device is utilized for the attempt, which supplies corresponding data for the calibration. In particular, the reference measuring device provides the data necessary for the determination of the orientation and position of the antenna for comparison with the data captured by the antenna. It can also be provided that the reference measuring device provides the satellite positions and/or the receiving intensity. The vehicle orientation as well as the position of the vehicle in a global coordinate system at the starting point of the calibration journey are consequently known.

During the calibration journey, the orientation or the change thereof based on the initial values is preferably likewise captured, utilizing sensors inside the vehicle or the vehicle's own sensor technology. Relative changes with respect to the starting point can be determined, by way of example, by a compass, an inertial measuring device, wheel speed sensors and/or steering angles. A further exemplary method for detecting the alignment is, in addition, described in DE 10 2016 219 935.8, wherein the orientation is detected from the satellite data. Sensor data received in such a way is preferably combined or fused in order to achieve the highest possible accuracy. This is preferably effected by utilizing a state estimator. Alternatively or particularly preferably, it can in addition be envisaged that a position detected using, in particular, GNSS data which have not been corrected or a course of movement of the calibration journey, which can be determined by GNSS receivers, is used. As a result, a localization in a global coordinate system and, in particular, in fusion with the information detected by further sensor technology or the state estimator, an alignment based on the global coordinate system can advantageously be achieved.

As indicated, the fusion of the information is effected, in particular utilizing a state estimator, e.g. a Kalman filter, to which the information of the sensor technology is supplied and which detects the vehicle orientation as well as the position and, consequently, accordingly the trajectory driven during the calibration journey. Alternatively or in addition, an extremely accurate reference measuring device can be utilized during the calibration journey, which supplies corresponding data for the calibration.

On the basis of the information determined by the sensor technology or the state estimator, the positions or trajectory of the vehicle is/are captured during the calibration journey. In addition, the respective direction vectors of the ego position relative to the respective satellite are determined with the aid of the satellite positions transferred with the ephemerides.

In each case, the deviation of the pseudo range, which is calculated on the basis of the position relative to the respective satellite, which is determined by the sensor technology or the state estimator, from the pseudo range, which is simply calculated with the aid of a GNSS signal, is preferably calculated. The deviation determined in such a way is deemed to be the phase center offset dependent on the respective direction vector. Consequently, quantitative knowledge regarding the phase center offset is available for the direction in question of the direction vector. Accordingly, this value preferably forms the correction information for correcting the phase center offset.

Consequently, the knowledge regarding the position and orientation of the vehicle in a global coordinate system, which are detected by sensor information or reference measuring technology, preferably forms the basis for the determination of the correction information. If, for example at a relative yaw angle (orientation) based on the initial alignment of 10°, it results that the distance from the satellite compared with the assumed actual position is 10 cm too short and is too weak, compared with a signal strength of 5 dB which is to be expected at this actual position, these difference values can be stored as calibration information. As the orientation changes, the phase center offset with respect to the receiving direction or direction vector relative to the satellite also changes. In this way, the calibration information is advantageously detected for a multiplicity of orientations.

Correction values and/or calculation specifications, e.g. polynomial interpolation with the correction values as sampling points, are preferably generated as correction information. The correction values can in particular be saved in a table, as a polynomial or in the form of another calculation basis.

Furthermore, the calibration range is preferably driven through multiple times. Due to the consequently higher number of measured values and calibration information for each alignment provided, an improvement of the accuracy of the correction information can be attained.

According to the invention, the correction information can be detected offline and/or online:

Offline: In accordance with an aspect, measuring data, in particular pseudo ranges and driving dynamics data, are initially simply plotted and stored during the calibration journey. Following the calibration journey, the correction information is determined by optimization calculation.

Online: In accordance with a further embodiment, the measuring data, in particular pseudo ranges and driving dynamics data, are plotted during the calibration journey and the correction information is calculated by optimization calculation during the calibration journey.

The correction information can be determined by the described procedure in order to compensate for a phase center offset of an antenna.

Starting from the detected correction information, the orientation of the vehicle can preferably be determined by optimization calculation during the usual operation of the vehicle, wherein an orientation is detected for a captured position, at which the direction-dependent corrections to be applied by the correction information have the smallest residues. In other words, the orientation at which the lowest deviation from the existing correction information or measured values exists is deemed to be the alignment.

The indicated steps of the method according to the invention can be executed in the indicated order. They can, however, also be executed in another order. The method according to the invention can be executed in one of its embodiments, for example with a determined set of steps, such that no further steps are executed. However, further steps can in principle also be executed, including those which are not indicated.

The invention claimed is:

1. A method for detecting correction information for an antenna for receiving data of a satellite of a satellite navigation system, having the steps of:
   determining first distance information of an antenna relative to a satellite of a satellite navigation system,
   capturing position information and orientation information of the antenna on the basis of sensor information,
   determining second distance information of the antenna relative to the satellite on the basis of the position information captured on the basis of the sensor information, detecting a deviation of the first distance information from the second distance information, determining correction information on the basis of the detected deviation, and storing, in a data memory, the correction information regarding the orientation information captured on the basis of the sensor information, wherein initial position information and initial orientation information of the antenna are captured on the basis of the sensor information at a starting point of a calibration journey.

2. The method according to claim 1, wherein the method is at least partially executed during the calibration journey with a vehicle having the antenna.

3. The method according to claim 2, wherein during the calibration journey the position information and the orientation information are captured on the basis of the sensor information regarding a change in terms of the initial position information and the initial orientation information at the starting point.

4. The method according to claim 3, wherein the sensor information or values stored in a data memory are used as the initial position information or the initial orientation information at the starting point of the calibration journey.

5. The method according to claim 4, wherein the initial position information or the initial orientation information obtained by the sensor information at the starting point of the calibration journey is based on information fused from sensor information by a state estimator.

6. The method according to claim 3, wherein the initial position information and the initial orientation information at the starting point of the calibration journey or the position information and the orientation information during the calibration journey are detected by the vehicle's own sensor technology or a reference measuring device.

7. The method according to claim 2, wherein a range driven at least once during the calibration journey is substantially circular or elliptical or has a plurality of changes of direction.

8. The method according to claim 2, wherein a plurality of calibration journeys are carried out at different times.

9. The method according to claim 2, wherein at least a plurality of correction information of the antenna is determined on the basis of the detected deviations and the correction information is not stored in the data memory during the calibration journey.

10. The method according to claim 2, wherein a plurality of correction information is determined on the basis of the detected deviations and the correction information is stored in the data memory during the calibration journey.

11. The method according to claim 1, wherein the determination of the correction information is carried out on the basis of the detected deviations by optimization calculation.

12. The method according to claim 11, wherein measuring signals of a reference measuring technology are used as comparative values for the optimization calculation in order to determine the correction information.

13. The method according to claim 1, wherein the orientation with respect to a global coordinate system is determined using a plurality of the detected correction information.

14. The method according to claim 1, further comprising determining by optimization calculation at which orientation smallest residues are produced for a plurality of detected correction information, wherein the orientation determined in such a way is deemed to be an actual orientation.

15. The method according to claim 1, wherein the correction information is used for correcting an angle-dependent phase center offset of the antenna.

16. The method according to claim 15, wherein in order to correct the angle-dependent phase center offset, the first distance information of the antenna is corrected using the correction information.

17. The method according to claim 15, wherein in order to correct the angle-dependent phase center offset, an absolute value of the correction information is deducted from a value of the first distance information of the antenna.

18. The method according to claim 1, wherein the correction information is used for correcting an angle-dependent phase center offset regarding an antenna reference point of the antenna.

19. A device for detecting correction information for an antenna, the device comprising:

an electronic control unit, and an antenna for receiving data of a satellite navigation system, wherein the electronic control unit is configured to:

determine first distance information of the antenna relative to a satellite of a satellite navigation system, capture position information and orientation information of the antenna on the basis of sensor information, determine second distance information of the antenna relative to the satellite on the basis of the position information captured on the basis of the sensor information, detect a deviation of the first distance information from the second distance information, determine correction information on the basis of the detected deviation, and store, in a data memory, the correction information regarding the captured orientation information, wherein initial position information and initial orientation information of the antenna are captured on the basis of the sensor information at a starting point of a calibration journey.

* * * * *